US007164731B2

(12) United States Patent
Chung et al.

(10) Patent No.: US 7,164,731 B2
(45) Date of Patent: Jan. 16, 2007

(54) APPARATUS AND METHOD OF ADAPTIVE FREQUENCY OFFSET ESTIMATIONS FOR A RECEIVER

(75) Inventors: I-Chou Chung, Shindian (TW); Chingwo Ma, Taipei (TW)

(73) Assignee: VIA Technologies, Inc., Taipei (TW)

( * ) Notice: Subject to any disclaimer, the term of this patent is extended or adjusted under 35 U.S.C. 154(b) by 834 days.

(21) Appl. No.: 10/402,154

(22) Filed: Mar. 31, 2003

(65) Prior Publication Data

US 2004/0190655 A1   Sep. 30, 2004

(51) Int. Cl.
    *H03K 9/00*   (2006.01)
(52) U.S. Cl. .................... 375/316; 375/324; 375/344
(58) Field of Classification Search ................ 375/316, 375/136, 137, 147, 152, 269, 261, 279, 280, 375/281, 346, 354, 362, 344, 340; 455/130, 455/226.1, 77, 136, 139, 182.1, 192.1, 502, 455/192.2, 192.3
See application file for complete search history.

(56) References Cited

U.S. PATENT DOCUMENTS

| 5,991,289 | A  | * | 11/1999 | Huang et al. ............ 370/350 |
| 6,590,945 | B1 | * | 7/2003  | Brardjanian et al. ..... 375/340 |
| 6,650,715 | B1 | * | 11/2003 | Kim et al. ............... 375/344 |
| 6,996,156 | B1 | * | 2/2006  | Ono ....................... 375/147 |
| 2003/0142761 | A1 | * | 7/2003 | Chen ...................... 375/326 |

* cited by examiner

*Primary Examiner*—Dac Ha
*Assistant Examiner*—Jaison Joseph
(74) *Attorney, Agent, or Firm*—Rabin & Berdo, P.C.

(57) ABSTRACT

An apparatus for estimating frequency offset of a demodulator is disclosed. An input symbol is regarded as a rotating phasor obtained by consecutive sampling symbols, while the phasor encompasses an argument containing phase rotated by frequency offset and phase difference by modulation polarity. An adaptive judgment circuit encompassing a decision feedback way is employed to de-polarize the phasor, i.e. to move out the argument of modulation. The adaptive judgment circuit includes a decision circuit and a multiplier. The decision circuit of the adaptive judgment circuit receives the phasor fed from the phase-increment extraction circuit to find a de-noise phasor by using the product of the phasor and a de-noise symbol, wherein the de-noise symbol is determined according to an inner product of the phasor and a last summation stored in a summation circuit. In the multiplier, the de-polarized phasor is obtained by multiplying the phasor by the de-noise symbol before feeding into the next stage, summation circuit. A summation circuit is used for estimating de-polarize phasor by a summation of the de-polarized phasors, while the summation is fed back to the decision circuit for deriving the inner product of the next input symbol. An argument circuit finally extracts the phase offset of the summation containing the frequency offset.

15 Claims, 3 Drawing Sheets

APPARATUS AND METHOD OF ADAPTIVE FREQUENCY OFFSET ESTIMATIONS FOR A RECEIVER

BACKGROUND OF THE INVENTION

1. Field of the Invention

The present invention relates to an apparatus and method of adaptive frequency offset estimations for a receiver, and particularly to an apparatus and method of adaptive frequency offset estimations for a receiver based on DBPSK demodulations.

2. Description of the Related Art

The carrier frequency offset can be determined directly by estimating a rotation rate of the phase offset between two adjacent samples. A digital frequency offset estimator is commonly used to extract phase increments between consecutive symbols. Since the transmitted data message is modulated in received symbols, the modulated data effect should be eliminated before the phase offset being calculated. A broadly used powering approach for DBPSK in the prior art is shown as follows.

FIG. 1 shows a block diagram of an apparatus in a conventional demodulator that estimates the phase offset of input symbols based on a DBPSK modulation approach. As shown in FIG. 1, the apparatus in a conventional demodulator includes a phase-increment extraction circuit 40, a squaring circuit 25, a summation circuit 20, an argument circuit 30, and a divider 35, while the phase-increment extraction circuit 40 further includes a delay circuit 41, a conjugate circuit 42, and a multiplier 45. The phase extraction circuit 40 receives input symbols represented by $Z_k = d_k e^{jk\Delta\theta}$ and the delay circuit 41 is used to store the last input symbol $Z_{k-1}$. The conjugate circuit 42 generates a conjugate $Z_{k-1}^*$ of the last input symbol $Z_{k-1}$ and the multiplier 45 derives a product of the input symbol $Z_k$ and the conjugate $Z_{k-1}^*$ of the last input symbol $Z_{k-1}$ to generate a phasor $R_k$. The phasor $R_k$ has an argument containing the phase increment $\Delta\theta$ rotated according to frequency offsets and the phase difference of successive samples of the modulation. The squaring circuit 25 receives the phasor $R_k$ and generates a square phasor $R_k^2$, which is insensitive to the phase difference of successive samples based on the DBPSK modulation. The summation circuit 20 calculates the summation of the square phasors $\Sigma R_k^2$ by summing up all the previous squares phasors, and finally the argument circuit 30 extracts the phase offset of the summation $\Sigma R_k^2$ rotated by the frequency offset. The phase offset of the summation of the squares phasors $\Sigma R_k^2$, similar to the expectation of the phase offsets of the squares $R_k^2$, is equal to double phase offset of the phasor $R_k$, $2\Delta fT$. The divider 35 divides the double phase offset $2\Delta fT$ to yield the phase offset $\Delta fT$ of the phasor $R_k$, therefore the frequency offset f can be estimated by using the phase offset of the phasor $R_k$.

As well known by the skills in the art, the squaring operations will reduce so-called SNR (Signal-to-Noise Ratio) in the conventional approach. Assumes $$R_k = \text{signal} + \text{noise}$$

and $$R_k^2 = \text{signal}^2 + 2\times\text{signal}\times\text{noise} + \text{noise}^2$$

Basically, a signal is significant larger than noise (i.e. |signal|>>|noise|), so the term noise² can be ignored in comparison with the other two. Therefore, the square $R_k^2$ can be approximated as:

$$R_k^2 \approx \text{signal}^2 + 2\times\text{signal}\times\text{noise}$$

and the SNR after the squaring operation is:

$$\text{signal}^2 \div (2\times\text{signal}\times\text{noise}) = \frac{1}{2}\times(\text{signal}\div\text{noise})$$

which is obvious a half of the SNR of the phasor $R_k$.

Obviously, there are disadvantages in the conventional frequency estimation approach as follows. Firstly, noise will be enhanced in the squaring circuit as aforementioned, which significantly reduces SNR and thus degrades the performance for obtaining decision boundaries while the training sequence is employed. In other word, the conventional approach is a time-cost way to make estimations achieve application requirement. However, for those applications that are not suffered by time-cost so seriously when the training sequence scheme is employed, the estimated phase offsets may not achieve accuracy requirements of these applications. Secondly, the conventional approach requires quite a complicated circuit for implementations. For example, the squaring circuit basically requires four multipliers to calculate the squaring values, and there requires a divider, which is usually composed of complicated circuitry for calculating the estimated phase offsets. There is a need to provide an apparatus and method that estimates frequency offsets adapted to a data decision approach with simpler circuit configurations and higher SNR than the conventional approach.

SUMMARY OF THE INVENTION

It is therefore an object of the present invention to provide an apparatus and method for estimating frequency offset in an efficient way.

In the embodiment, the input symbol is regarded as a rotating phasor obtained by consecutive sampling symbols, while the phasor encompasses an argument containing phase rotated by frequency offset and phase difference by modulation polarity. The phasor is de-polarized, i.e., rotated to the same polarity by a boundary decision, to form a de-noise phasor, which only contains phase rotated by frequency offset and preserving the same SNR. The frequency offset is estimated directly by an argument of a summation of the de-noise phasor divided by a sampling period.

In the embodiment, the present invention provides the apparatus that contains an adaptive judgment circuit in accompanied with a decision feedback way to de-polarize the phasor, i.e. to move out the argument of modulation. The adaptive judgment circuit includes a decision circuit and a multiplier. The decision circuit of the adaptive judgment circuit receives the phasor fed from the phase-increment extraction circuit to find a de-noise phasor by using the product of the phasor and a de-noise symbol, wherein the de-noise symbol is determined according to an inner product of the phasor and a last summation stored in a summation circuit. In the multiplier, the de-polarized phasor is obtained by multiplying the phasor by the de-noise symbol before feeding into the next stage, summation circuit. A summation circuit is used for estimating de-polarize phasor by a summation of the de-polarized phasors, while the summation is fed back to the decision circuit for deriving the inner product of the next input symbol. An argument circuit finally extracts the phase offset of the summation containing the frequency offset.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE INVENTION

Figure 1:
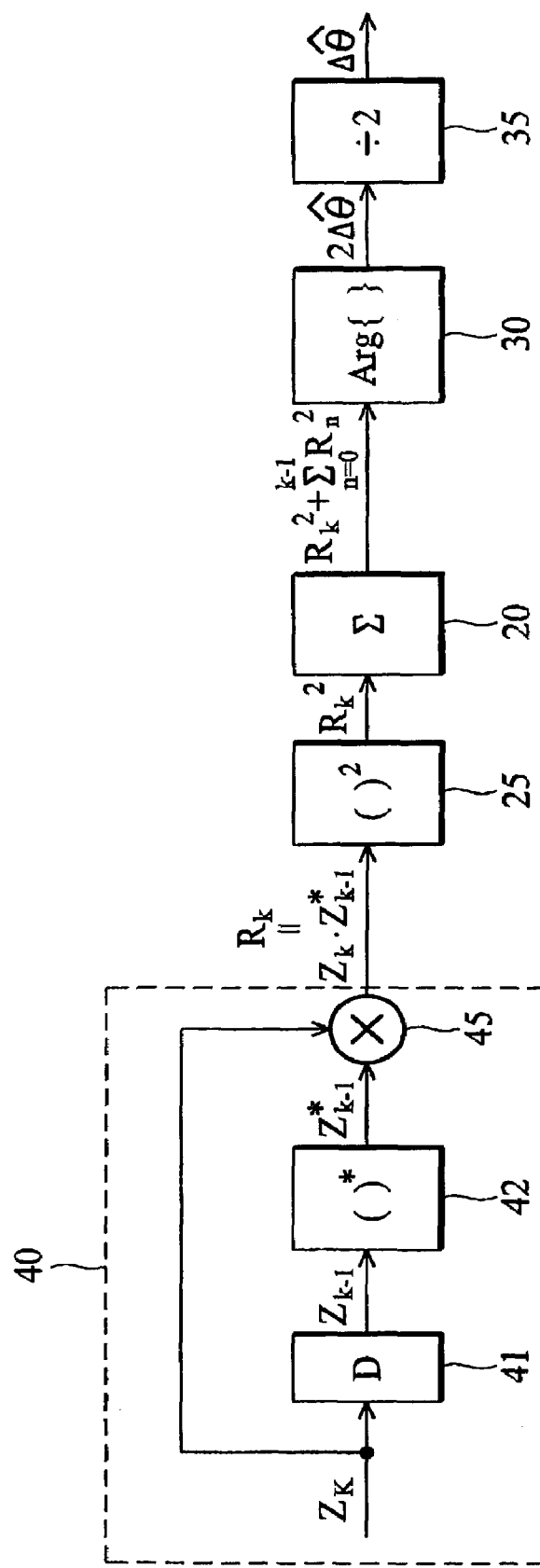
FIG. 1 shows a block diagram of an apparatus in a conventional demodulator that estimates the phase offsets of input symbols based on a DBPSK approach.
Figure 2:
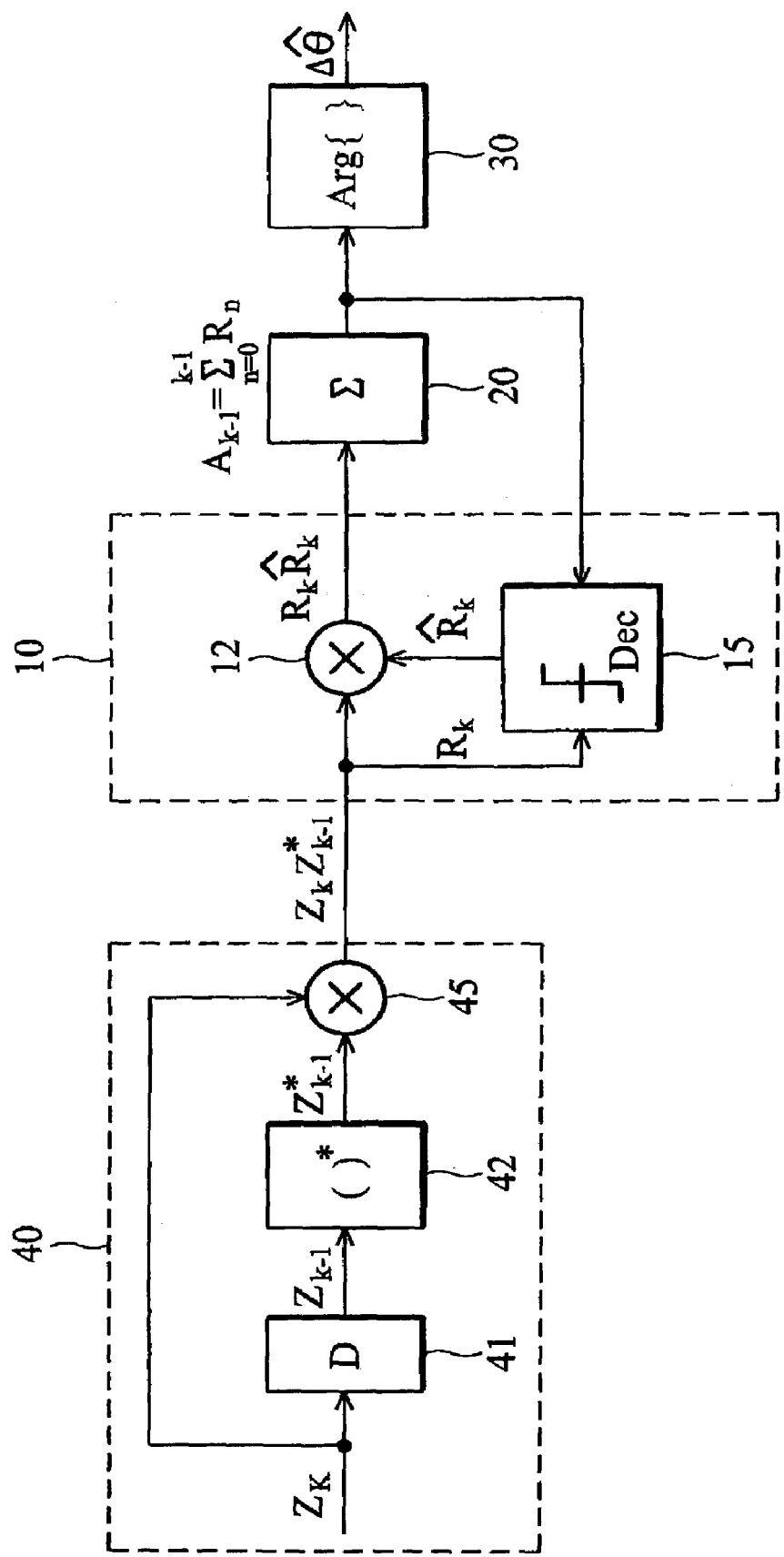
FIG. 2 shows a block diagram of an apparatus adaptively performing boundary-decision for a DBPSK demodulator in the present embodiment.

FIG. 2 shows a block diagram of an apparatus that performs boundary-decision adaptively for a DBPSK demodulator in the present embodiment. As shown in FIG. 2, the apparatus of the embodiment includes an adaptive judgment circuit 10, a summation circuit 20, an argument circuit 30, and a phase-increment extraction circuit 40. The adaptive judgment circuit 10 includes a decision circuit 15 and a multiplier 12, while the phase-increment extraction circuit 40 includes a delay circuit 41, a conjugate circuit 42, and a multiplier 45. The phase extraction circuit 40 has the same configuration and functions as described in the background. That is, the phase extraction circuit 40 receives input symbols $Z_k$ and the delay circuit 41 stores the last input symbol $Z_{k-1}$, the conjugate circuit 42 generates a conjugate $Z_{k-1}^*$ for the last input symbol $Z_{k-1}$, and the multiplier 45 derives a phasor $R_k$ by using the product of the input symbol $Z_k$ and the conjugate $Z_{k-1}^*$ of the last input symbol. The adaptive judgment circuit 10 receives the phasor $R_k$ and produces a de-noise phasor $R_k R_K^\wedge$ by using the product of the phasor $R_k$ and a de-noise symbol $R_k^\wedge$, wherein the de-noise symbol $R_k^\wedge$ is determined by the decision circuit 15 according to an inner product of the phasor $R_k$ and a summation $A_{k-1}$. The multiplier 12 performs the multiplication of the phasor $R_k$ and the de-noise symbol $R_k^\wedge$, while the summation circuit 20 produces the summation $A_{k-1}$, by summing up all the previous de-noise phasor $R_k R_K^\wedge$.

Figure 3:
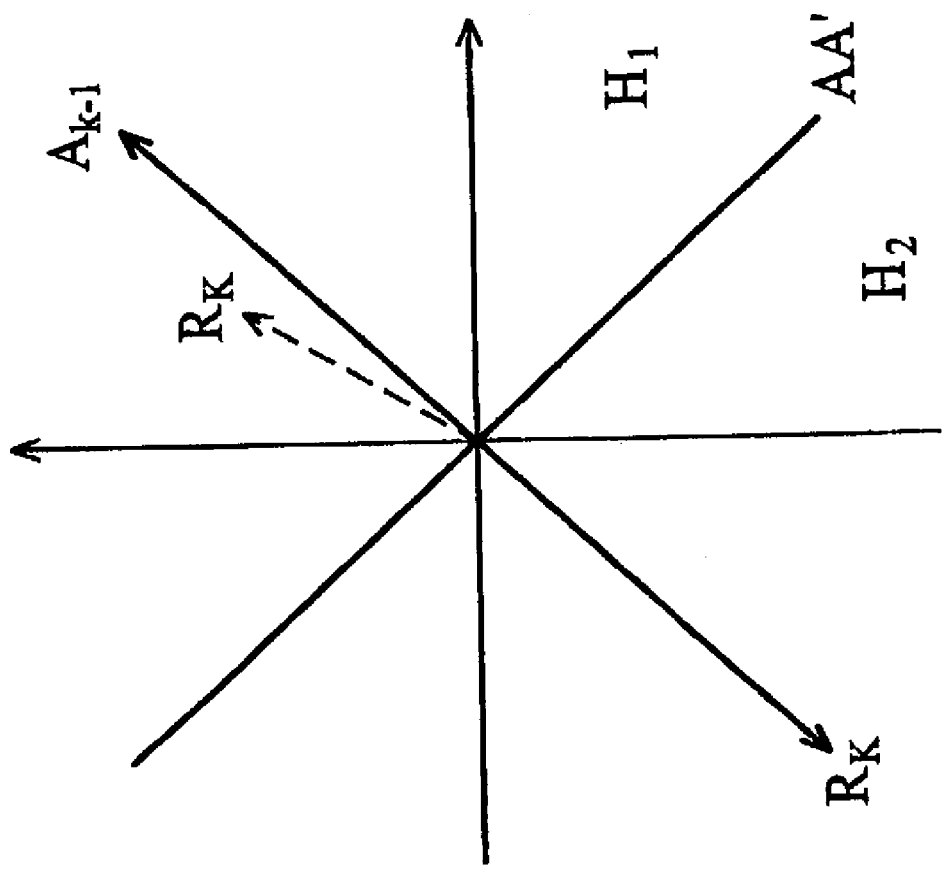
FIG. 3 shows a diagram of decision regions.

The summation $A_{k-1}$ and de-noise symbol $R_k^\wedge$ are defined as follows:

$$A_{k-1} = \sum_{n=0}^{k-1} R_n = \sum_{n=0}^{k-1} R_k R_k^\wedge$$

and the inner product P of $R_k$ and $A_{k-1}$ is shown as $P = R_k \cdot A_{k-1} = Re(R_k) \times Re(A_{k-1}) + Im(R_k) \times Im(A_{k-1})$ $R_k^\wedge = 1$ if $P > 0$ $-1$ if $P < 0$ Re($R_k$): real part of $R_k$
Re($A_{k-1}$): real part of $A_{k-1}$
Im($R_k$): imaginary part of $R_k$
Im($A_{k-1}$): imaginary part of $A_{k-1}$ In DBPSK modulation, the phasor $R_k$ has two opposite phases, i.e., two opposite polarities, which indicates that a mechanism is needed to rotate the phasor having the opposite polarity to the same polarity for the purpose of estimating phase offsets. The decision circuit 15 and the multiplier 12 in the embodiment provide this mechanism to achieve the above requirement. The de-noise symbol $R_k^\wedge$ is used for detecting and de-polarizing the polarity of the phasor $R_k$. The decision circuit 15 employs a decision boundary to determine which decision region the de-noise symbol $R_k^\wedge$ falls in presence of noise. FIG. 3 shows a diagram of decision regions. Without loss of generality, assumes that the summation $A_{k-1}$ falls in a decision region H1. There are two possible cases H1 and H2 that indicate these two decision regions that the phasor $R_k$ may fall, respectively. The phasor $R_k$ has the same polarity as summation $A_{k-1}$ when the phasor $R_k$ falls in the same decision region H1 as summation $A_{k-1}$, which indicates that the inner product of the phasor $R_k$ and the summation $A_{k-1}$ is great than zero. Thus, the de-noise symbol is 1, and the phasor $R_k$ is added to the summation $A_{k-1}$ directly. The phasor $R_k$ will have the opposite polarity to summation $A_{k-1}$ when the phasor $R_k$ falls in the decision region H2, which indicates that the inner product of the phasor $R_k$ and the summation $A_{k-1}$ is less than zero. Thus, the de-noise symbol is equal to $-1$, and the phasor $R_k$ must be rotated 180° before added to the summation $A_{k-1}$. Therefore, the de-noise phasor $R_k R_K^\wedge$ is de-polarized from the phasor $R_k$, i.e. the de-noise phasor $R_k R_K^\wedge$ is always locates at the same decision region as the summation does.

Please note that the de-noise phasor $R_k R_K^\wedge$ has the same SNR as the phasor $R_k$, i.e. noise is not enhanced in the de-noise phasor $R_k R_K^\wedge$ since the de-noise symbol $R_K^\wedge$ has a magnitude of 1. The summation $A_{k-1}$ functions as an estimator of the offset phasor $\exp(j\Delta fT)$, wherein $\Delta f$ is frequency offset and T is symbol interval. Since the summation $A_{k-1}$ has averaged out additive noise, the orientation of the summation $A_{k-1}$ is obviously much closer to that of the offset phasor $\exp(j\Delta fT)$ than the phasor $R_k$. The inner product of the phasor $R_k$ and the summation $A_{k-1}$ is nearly the same as that of the offset phasor $\exp(j\Delta fT)$ and the phasor $R_k$. Therefore, the de-noise symbol $R_k^\wedge$ can be decided correctly, and finally an argument circuit 30 extracts the phase offset of the summation $A_{k-1}$ containing the frequency offset. Please note that the disclosed apparatus of the embodiment utilizes a de-noise phasor instead of squaring operation, which indicates that the phase offset of the summation $A_{k-1}$, similar to the expectation of the phase offsets of the phasor $R_k$, is equal to $\Delta fT$ rather than $2\Delta fT$. Moreover, the divider for dividing by 2 in the conventional approach can be eliminated in the embodiment, which indicates that the SNR of the present invention will be the same as original signal. Assumes:

$R_k = Z_k Z_{k-1}^* =$ signal+noise since the de-noise symbol is determined without noise, therefore $|R_k^\wedge| = 1$ obviously the SNR of the de-noise phasor $R_k R_K^\wedge$ is the same as the training sequence $Z_k$.

The advantages of the present invention are as the followings. Firstly, there is less circuit complexity than conventional approach for implementation, e.g., only two multipliers may meet requirements. Actually, one multiplier is necessary because the other multiplier performing the multiplication of integer 1 (one) or $-1$ is much simpler than a normal multiplier. Secondly, the phase offset can be estimated directly by using the de-noise phasors instead of the square of the phasor, thus the divider used for dividing the estimated phase offset can be eliminated. No noise enhancement is arisen by the apparatus since the SNR of the de-noise phasor $R_k R_K^{\hat{}}$ is the same as the training sequence $Z_k$. In other words, the present invention provides more accurate estimation result than the prior art.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. An apparatus for estimating frequency offset of a demodulator comprising:
   a phase-increment extraction circuit for generating a phasor by multiplying an input symbol by a conjugate of a last input symbol;
   an adaptive judgment circuit for generating a de-noise phasor by de-polarizing the phasor in responsive to a summation and the phasor; and
   a summation circuit for generating the summation of a plurality of de-noise phasors to estimate the frequency offset.

2. The apparatus as claimed in claim 1 wherein the adaptive judgment circuit comprises:
   a decision circuit for generating a de-noise symbol in responsive to an inner product of the phasor and a last summation derived by the summation circuit; and
   a multiplier for generating the de-noise phasor by multiplying the phasor with the de-noise symbol.

3. The apparatus as claimed in claim 2 wherein the de-noise symbol is positive when a polarity of the phasor is opposite to that of the last summation, and the de-noise symbol is negative when a polarity of the phasor is the same as that of the last summation.

4. The apparatus as claimed in claim 1 wherein the phase extraction circuit comprises:
   a delay circuit for storing the last input symbol;
   a conjugate circuit for generating the conjugate of the last input symbol; and
   a multiplier for generating the phasor by multiplying the input symbol with the conjugate of the last input symbol.

5. The apparatus as claimed in claim 1 further comprising an argument circuit for extracting the estimated phase offset output from of the summation circuit.

6. An apparatus for estimating frequency offset of a demodulator comprising:
   a phase-increment extraction circuit for generating a phasor by multiplying an input symbol by a conjugate of a last input symbol;
   an adaptive judgment circuit for generating a de-noise phasor by multiplying the phasor by a de-noise symbol, wherein the de-noise symbol is determined by an inner product of a last summation and the phasor; and
   a summation circuit for generating the summation of a plurality of de-noise phasors to estimate frequency offset.

7. The apparatus as claimed in claim 6 wherein the adaptive judgment circuit comprises:
   a decision circuit for generating a de-noise symbol in responsive to an inner product of the phasor and a last summation derived by the summation circuit; and
   a multiplier for generating the de-noise phasor by multiplying the phasor with the de-noise symbol.

8. The apparatus as claimed in claim 7 wherein the de-noise symbol is positive when the inner product of the phasor and the last summation is positive and the de-noise symbol is negative when the inner product of the phasor and the last summation is negative.

9. The apparatus as claimed in claim 6 wherein the phase extraction circuit comprises:
   a delay circuit for storing the last input symbol;
   a conjugate circuit for generating the conjugate of the last input symbol; and
   a multiplier for generating the phasor by multiplying the input symbol with the conjugate of the last input symbol.

10. The apparatus as claimed in claim 6 further comprising an argument circuit for extracting the estimated phase offset output from the summation circuit.

11. A method for estimating phase offsets of a demodulator comprising:
    generating a phasor by multiplying an input symbol by a conjugate of a last input symbol;
    generating a de-noise phasor by de-polarizing the phasor according to a last summation of a plurality of de-noise phasors that is derived by a plurality of input symbols input before the currently input symbol; and
    generating a current summation in responsive to the de-noise phasors associated with the input symbol and the last summation to estimate frequency offset.

12. The method as claimed in claim 11 wherein the step of generating the de-noise phasor comprises:
    generating a de-noise symbol according to an inner product of the phasor and the last summation; and
    generating the de-noise phasor by multiplying the phasor by the de-noise symbol.

13. The method as claimed in claim 12 wherein the de-noise symbol is positive when the inner product of the phasor and the last summation is positive and the de-noise symbol is negative when the inner product of the phasor and the last summation is negative.

14. The method as claimed in claim 11 wherein the step of generating the phasor comprises:
    generating the conjugate of the last input symbol; and
    generating the phasor by multiplying the input symbol with the conjugate of the last input symbol.

15. The method as claimed in claim 11 further comprising a step of extracting the estimated phase offset in responsive to the current summation.

* * * * *